Nov. 26, 1963 M. ARCHAMBAULT ETAL 3,112,172
PRODUCTION OF VARIOUS LITHIUM SALTS
Filed Dec. 5, 1960 2 Sheets-Sheet 1
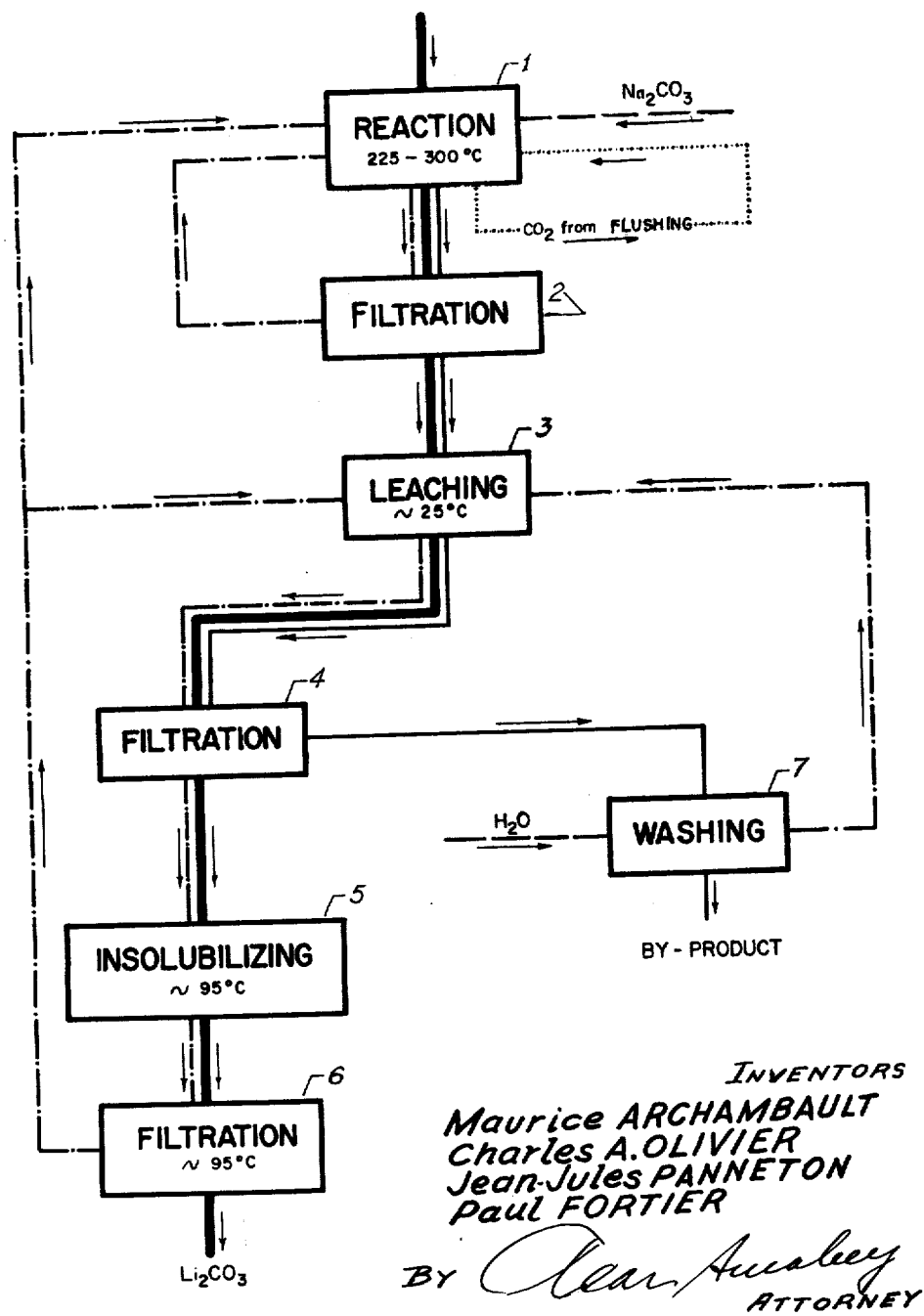

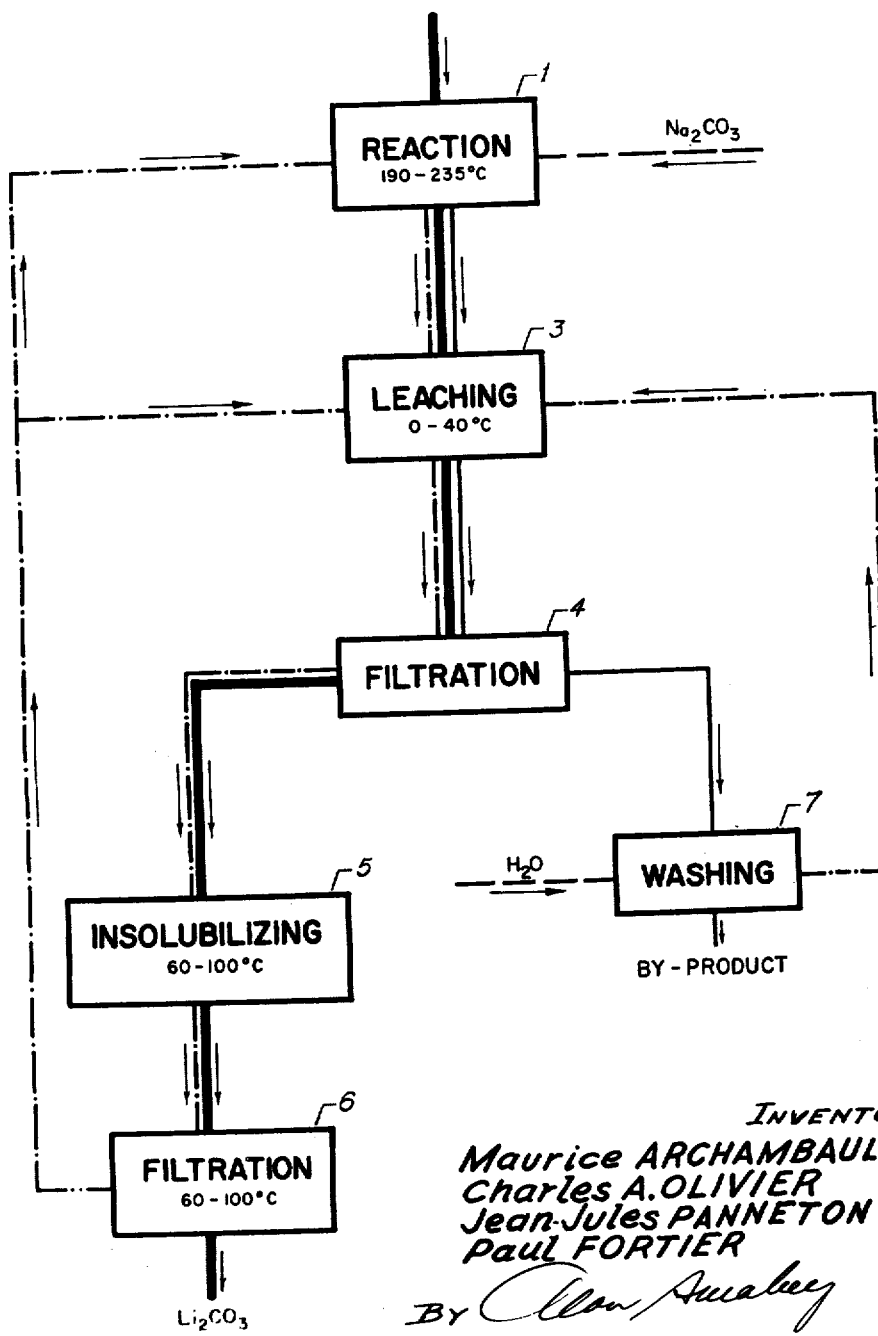

though beta spodumene is a preferred species.

3,112,172
PRODUCTION OF VARIOUS LITHIUM SALTS

Maurice Archambault, Quebec, Quebec, Charles A. Olivier, Ste.-Foy, Quebec, and Jean Jules Panneton and Paul Fortier, Quebec, Quebec, Canada, assignors to Department of Natural Resources of the Province of Quebec, Quebec, Quebec, Canada
Filed Dec. 5, 1960, Ser. No. 73,680
23 Claims. (Cl. 23—63)

This invention relates to the production of various lithium salts from calcined lithium-bearing silicates, of which beta spodumene is a preferred species.

In order to achieve a satisfactory yield of lithium values, the decomposition of these silicates with alkali metal salts involves specific conditions, depending upon the particular alkali metal salt employed. The commercial processes for producing lithium salts generally do not act on the silicates directly with the alkali metal salts, but employ relatively drastic preliminary steps, for example, decomposition with sulphuric acid to form lithium sulfate and a discardable residue. The lithium sulfate in solution is then converted to solid $Li_2CO_3$, by addition of sodium carbonate, and then, if desired, to further end salts.

Recently, there has been a paper disclosure showing the treatment of spodumene with any sodium or calcium salt which is soluble or slightly soluble in water, to produce water-soluble lithium salt. That disclosure also states that extraction can best be obtained when the reacting solution contains sodium and hydroxyl ions, or sodium, calcium and hydroxyl ions and that the latter combination is preferable. The specific procedure given in the disclosure employs, for treatment, calcium chloride and sodium chloride to derive lithium chloride; sodium chloride followed by calcium hydroxide to form lithium chloride and lithium hydroxide; or sodium hydroxide and lime to form lithium hydroxide. Where lithium carbonate is desired, the lithium hydroxide resulting from the decomposing step is gassed with carbon dioxide.

In contrast to these procedures, which all derive lithium carbonate from an intermediate product, the applicants have now developed a process which leads directly from beta spodumene to lithium carbonate: they have found that calcined lithium-bearing silicates can be reacted directly with aqueous salt selected from the group consisting of sodium carbonate, sodium bicarbonate and sodium sesquicarbonate, and provided that a combination of critical conditions forming a part of this invention are observed, a good yield of lithium carbonate is obtained and is readily recovered by a straight-forward recovery procedure according to the invention.

The applicants have further found that the addition of calcium salts in this decomposing step as recommended by the prior art, lowers the yield of extracted lithium and complicates the subsequent treatment.

More specifically, in accordance with the invention, beta spodumene or other appropriate lithium-bearing material is first reacted in a pressure vessel with from about 1 to 12 times, preferably from 1 to 6 times its weight, of an aqueous salt selected from the group consisting of sodium carbonate, sodium bicarbonate or sodium sesquicarbonate at an elevated temperature of at least 140° C. up to about 300° C., for time which varies from about 1 minute to about 2 hours, depending on the type and amount of carbonates used, the specific temperature and on the by-products desired. The amount of carbonate and the pressure will vary depending upon the type of carbonate and on the specific temperature.

This reaction results in an aqueous slurry containing lithium carbonate and sodium aluminosilicates, the composition of which may be regulated, according to the invention, by adjusting the type and amount of carbonate used in conjunction with the specific conditions of the decomposition. The lithium salt is in good yield and in a form that can be recovered by a straight-forward procedure also forming a part of the invention, by which selected marketable by-products can also be recovered.

According to this procedure, the slurry is treated with cold water and enough carbon dioxide to saturate the resulting mixture at ambient atmosphere or super-atmospheric pressure. The total amount of water (water in slurry plus added water) should be from about 25 to about 70 times the weight of the lithium oxide present in the slurry, so as to dissolve, at a temperature from about 10° C. below zero to about 40° C. above, the lithium bicarbonate which was formed, then the final insoluble residue is separated from the solution containing the bicarbonate. The solution is then heated to a temperature within the range from about 60° C. to about 100° C. to drive off the carbon dioxide as a gas thereby insolubilizing the lithium carbonate.

A modification of this procedure by which further unexpected results are achieved is by treating the slurry with cold water in amounts at least 165 to about 250 times the weight of the lithium oxide present in the lithium-bearing charge, so as to dissolve the lithium carbonate at a temperature from about 0° C. to about 40° C. The final insoluble residue is then separated from the solution containing the lithium carbonate, and the lithium-bearing solution is heated at a temperature from about 60° C. to about 100° C., so as to insolubilize its lithium content in the form of crystalline $Li_2CO_3$, the latter being recovered by filtration or centrifugation.

DETAILED DESCRIPTION—TECHNOLOGY

The invention has been generally described and it will now be explained in further detail by reference to satisfactory apparatus and procedures which are illustrated in the accompanying drawings, in which:

FIGURE 1 is a flow-diagram which may be adopted when the decomposing agent used is sodium bicarbonate or sodium sesquicarbonate.

FIGURE 2 is a flow-diagram which may be adopted when sodium carbonate is used in small excess as primary reactant.

Referring now to FIG. 1, the beta spodumene is introduced into a pressure vessel with a sodium salt of carbonic acid in an amount sufficient to compensate for the salt spent in previous reaction together with the required amounts of solutions from the filtration steps 2 and 6 and with the carbon dioxide gas evolved when the preceeding batch was flushed out of the reactor (step 1). This way, the ratio of carbon dioxide to sodium carbonate is maintained approximately constant. After the reaction mixture has been kept agitated for the proper length of time at the recommended temperature, it is flushed out, carbon dioxide gas thus evolved being recovered for the next batch, whereas the reaction mixture is filtered while still hot (step 2).

The solution coming out of this filtration step contains most of the unspent sodium salt and is returned to the reaction step 1; on the other hand, the solid material is discharged into a leaching vat step 3. This leaching vat should be large enough to contain the amount of solution from steps 6 and 7 necessary to dissolve all the lithium carbonate contained in the filter cake; this vat should also be equipped with a good stirring device and a cooling system unless the solutions be previously cooled. When the leaching is completed, this dilute slurry is filtered or centrifuged preferably in a continuous operation (filtration step 4); the solid by-product is preferably water washed (step 7) before being stockpiled.

The saturated or almost saturated lithium carbonate solution obtained from the filtration step 4 is then heated to insolubilize most of its lithium carbonate content (step 5) and the lithium carbonate slurry so produced is filtered or preferably centrifuged (filtration step 6) to give almost chemically pure lithium carbonate to be marketed after drying. The solution from this filtration step is used for the reaction step 1 and to a greater extent for the leaching step 3.

Referring to FIG. 2, the beta spodumene is treated in a stirred pressure vessel or preferably in a continuous autoclave with sodium carbonate—the sodium carbonate being in small excess, for example, 20 percent—and a part of a solution recovered from a subsequent step of the process (filtration step 6). After autoclaving, the reaction mixture is brought into a leaching vat 3 where it is contacted with the remaining of the solution from filtration step 6 plus the wash-water from step 7 and additional water if necessary. This leaching step is conducted at a low temperature and under good conditions of stirring. The slurry from the leaching vat is then filtered (step 4); the insoluble material is preferably water washed (step 7) before being stockpiled and the solution from this filtration step is subsequently heated to insolubilize most of its lithium carbonate content (insolubilizing step 5). The lithium carbonate slurry is then treated as mentioned in the description of FIGURE 1.

These two figures should only be considered as examples; the applicants are well aware of the feasibility of other arrangements which they consider as being only good engineering.

In the drawings the thick solid line refers to the flow of lithium, the thin solid line—the flow of spent sodium, the chain line—the circuit of solutions, and the hatched line—the circuit of carbon dioxide.

The decomposition step is carried out under pressure, as a means of maintaining the water in the liquid phase. Otherwise, the degree of pressure is not critical and will vary with the other conditions of the reaction. Appropriate equipment for withstanding pressure usually encountered with this type of reaction must be employed.

STARTING MATERIALS

The lithium-bearing minerals that are particularly amenable to treatment by the applicants' process are the following:

(1) Spodumene: $Li_2O.Al_2O_3.4SiO_2$
(2) Petalite: $Li_2O.Al_2O_3.8SiO_2$
(3) Eucryptite: $Li_2O.Al_2O_3.2SiO_2$
(4) Lepidolite or lithium-mica:
   $(Li,K,Na)_2Al_2(SiO_3)_3(F,OH)_2$ Before being treated, the above mentioned silicates require a calcining treatment at temperatures of which the minima vary according to the minerals, from about 680° C. to about 980° C., to cause their crystal lattice to change or their dissociation to occur.

For spodumene, the modification is known to take place at about around 870° C., and to be only a change in the crystalline structure; this calcined spodumene is called beta spodumene.

For petalite, the heating to about 680° C., is known to cause its dissociation to beta spodumene and free silica.

For eucryptite, heating to around 980° C., produces its conversion from trigonal structure to a new allotropic form, called the hexagonal form.

For lepidolite, heating to about 850° C., is known to cause the evolution of its volatile elements (F and OH) and its breaking down to para-lepidolite which is a mixture of beta spodumene, nephelite and leucite.

BY-PRODUCTS OF TREATMENT

The solid residue left after lithium values are extracted by the applicants' process is essentially constituted of one or a few of the following complex sodium silicates:

(1) An anhydrous sodium aluminosilicate, jadeite-like, in chemical composition: $(Na_2O.Al_2O_3.4SiO_2)$
(2) An isometric zeolite: $(Na_2O.Al_2O_3.4SiO_2.xH_2O)$
(3) An anisometric zeolite: $(Na_2O.Al_2O_3.2SiO_2.yH_2O)$
(4) A sodic cancrinite, approximating:
   $(3Na_2O.4Al_2O_3.9SiO_2.2Na_2CO_3.3H_2O)$ The preferential production of one or the other of these silicates is possible—their relative production being controlled by proper adjustment of operating conditions.

All of these residual silicates are of potential values for the industry, although to varying degrees.

THE DECOMPOSING STEP

Conditions and Chemical Required

In the decomposing step, the only chemicals consumed by the process are sodium salts of carbonic acid either the carbonate proper ($Na_2CO_3$) often called "soda ash" and sometimes "normal sodium carbonate," the bicarbonate ($NaHCO_3$ also known as "baking soda" or the sesquicarbonate ($Na_2CO_3.NaHCO_3$), also known as "trona salt." These carbonates are used with water at various temperatures. In the decomposition of the lithium-bearing silicates, the following factors are interdependent and critical: amounts and types of sodium carbonate, proportions of water, temperatures and time of reaction. This is illustrated by the following table.

| By-Product Desired | Reactant and Reaction Requirements | | | | |
|---|---|---|---|---|---|
| Type of Na aluminosilicate | Type of Na reactant | Weight ratio of reactant to $Li_2O$ | Weight ratio of water to lithium-bearing charge | Temperature range, ° C. | Time range (minutes) |
| Jadeite-like in chemical composition $(Na_2O.Al_2O_3.4SiO_2)$ | Carbonate | 3.5 to 7 | 1.0 to 1.6 | 150–180 | 35 to 50. |
|  | Bicarbonate | 6 to 12 | 1.5 to 2 | 180–215 | 60 to 120. |
|  | Sesquicarbonate | 4.3 to 8.6 | 1.8 to 1.4 | 165–205 | 30 to 60. |
| Isometric zeolite $(Na_2O.Al_2O_3.4SiO_2.xH_2O)$ | Carbonate | 3.5 to 7 | 1.3 to 2.3 | 185–250 | 10 to 60. |
|  | Bicarbonate | 6 to 12 | 1.5 to 2.2 | 225–300 | 15 to 90. |
|  | Sesquicarbonate | 4.3 to 8.6 | 1.4 to 2 | 185–275 | 20 to 75. |
| Anisometric zeolite $(Na_2O.Al_2O_3.2SiO_2.yH_2O)$ | Carbonate | 7 to 14 | 1.3 to 2 | 140–175 | 5 to 60. |
| Sodic cancrinite approximating $(3Na_2O.4Al_2O_3.9SiO_2.2Na_2CO_3.3H_2O)$ | do | 14 to 29 | 2.5 to 7 | 185–200 | 1 to 5. |

Sodium Carbonate

As mentioned in the table, four different by-products may be obtained, when using $Na_2CO_3$, as the reactant.

However when anisometric sodic zeolite and sodic cancrinite are formed, there is enough concomitant production of alkali metal salts of silicic acids to render the filtration extremely difficult, and the extraction and recovery of the lithium values industrially impossible, should water alone be used for the leaching of the primary reaction products.

Although filtration and washing are very easy when anhydrous sodium aluminosilicate jadeite-like in chemical composition is formed, the production of isometric zeolite is preferred when $Na_2CO_3$ is used in the decomposing step.

The optimum conditions for the formation of isometric zeolite when leaching with water alone, are generally met with an amount of $Na_2CO_3$ preferably 10% to 30% in excess over the theoretical amount required (i.e. from about 3.8 to about 4.6 times the weight of the lithium oxide present), the temperature being preferably in the range from about 190° C. to about 235° C., in presence of water corresponding preferably from about 1.6 to about 2 times the weight of the lithium-bearing charge, with a time of reaction from about 10 to about 50 minutes.

Sodium Sesquicarbonate

When the anhydrous sodium aluminosilicate jadeite-like in chemical composition is the by-product desired, the beta spodumene is contacted with sodium sesquicarbonate in an amount ranging from about 4.3 to about 8.6 times the weight of the lithium oxide present, in the presence of water in an amount from about 1.4 to about 1.8 times the weight of the lithium-bearing material, at a temperature from about 165° C. to about 205° C., for from about 30 minutes to about 1 hour.

When the isometric sodic zeolite is sought for as by-product, the beta spodumene is contacted with sodium sesquicarbonate in an amount ranging from about 4.3 to about 8.6 times the weight of the lithium oxide present, with water in an amount from about 1.4 to about 2 times the weight of the lithium-bearing material, at a temperature from about 185° C. to about 275° C., for from about 20 to about 75 minutes.

Sodium Bicarbonate

When the anhydrous sodium aluminosilicate jadeite-like in chemical composition is the by-product desired, the beta spodumene is contacted with sodium bicarbonate in an amount ranging from about 6 to about 12 times the weight of the lithium oxide present, in the presence of water in an amount from about 1.5 to about 2 times the weight of the lithium-bearing material, at a temperature from about 180° C. to about 215° C., for from about 1 hour to about 2 hours.

When the isometric sodic zeolite is sought for as by-product, the beta spodumene is contacted with sodium bicarbonate in an amount ranging from about 6 to about 12 times the weight of the lithium oxide present, in the presence of water in an amount from about 1.6 to about 2.2 times the weight of the lithium-bearing material, at a temperature from about 225° C. to about 300° C., for from about 15 to 90 minutes.

Calcined lepidolite, petalite and eucryptite would behave essentially like beta spodumene, giving the same reaction products as those mentioned above.

LEACHING AND INSOLUBILIZING

The applicants have considered the economic feasibility of leaching the autoclave reaction products with water or with an unsaturated lithium carbonate solution containing no free carbon dioxide gas. Although the amount of leach solution in this case is quite larger and although the amount of heat to insolubilize the lithium carbonate thus dissolved is proportionally higher, the applicants have found that conditions exist where such leaching is advantageous.

For example, in practice, enough water or solution is added and stirred with the autoclave reaction products to solubilize completely all the lithium present. Amount of water to be supplied should be at ltast 165 to about 250 times the weight of the lithium oxide present. Preferred leaching temperatures are within the range of 0° C. and about 40° C. Under such conditions, thorough leaching is effected within a period of time ranging from about 15 minutes to around two hours. After filtration done at the temperatures used for leaching, the pregnant solution is heated for about 15 minutes to around 60 minutes at temperatures ranging from about 60° C. to about 100° C., with a view to insolubilizing most of its lithium content, leaving the solution that is used to leach further quantities of reacted lithium-bearing material.

However the above water leaching would be worthless, should the sodium aluminosilicate formed be either anisometric sodic zeolite or sodic cancrinite or a mixture of both.

PRODUCING LITHIUM SALTS OTHER THAN THE CARBONATE

Using their process, the applicants have also developed a new method for producing lithium salts other than the carbonate, which is definitely simpler and more economical than the one followed in the prior art processes. They have found, indeed, that their raw leach lithium solution was unexpectedly so free from contaminating impurities, that they could surprisingly precipitate directly from it various marketable lithium salts—among those more water-insoluble than the carbonate—without resorting to any previous purification or concentration of the solution. Such precipitation is effected by adding to the above mentioned raw leach solution the proper amount of one of the following sodium salts: sodium fluoride, sodium silicates, sodium phosphates and any of the fatty acids sodium salts. The addition of such sodium salts causes the corresponding lithium salts to precipitate and at the same time regenerates a sodium salt of carbonic acid which is used advantageously to decompose fresh lithium-bearing charge.

In the prior art processes, the method for producing the above mentioned lithium salts is complicated and costly. It comprises the steps of: decomposing beta spodumene through the action of a chemical capable of giving a soluble lithium salt; neutralizing the solution of said lithium salt or eliminating from it contaminating impurities that are present; evaporating said solution to increase its lithium content; treating said neutralized, purified and concentrated solution with sodium carbonate or carbon dioxide gas to precipitate lithium carbonate; recovering by centrifugation said lithium carbonate; treating said lithium carbonate with an acid in aqueous medium to produce the lithium salt desired; neutralizing the slurry so-obtained; and finally recovering by filtration or centrifugation the lithium salt sought for.

In the applicants' development, the raw leach solution of the primary reaction product is of such a quality that by mere addition of a sodium salt selected among those mentioned above, a commercially pure lithium salt is precipitated; this achievement being realized without any purification step of the leach solution and without having to purify, precipitate, filter and dry the intermediate lithium carbonate, according to the common practice of the prior art processes. Besides, when precipitating the insoluble lithium salt, the sodium combines with the carbonic anion to regenerate the sodium carbonate necessary to decompose fresh beta spodumene. Consequently the sodium salt used as a precipitant becomes theoretically the only chemical spent to derive the corresponding lithium salt from spodumene.

The applicants have also found that the rate of precipitation and the purity of the precipitated salt increase with the temperature. It is recommended therefore to effect the precipitation at a temperature ranging from about 50° C. to about 80° C. particularly when the precipitant is a sodium phosphate, silicate or fatty acid salt. The excess of precipitant must also be carefully controlled; too large an excess may cause trouble later on when the solutions are reused in the decomposing step. Usually, an excess of about 1 to 5% over the stoichiometric amount necessary is recommended; this excess varying with the relative insolubility of the lithium salt desired.

For the purpose of giving further details to illustrate the invention, the applicants furnish the following examples of preferred procedures. All parts mentioned in the examples are by weight.

EXAMPLE 1

One hundred parts of calcined or beta spodumene concentrate analysing 5.25% $Li_2O$ (corresponding to a mixture of about 70% spodumene, 15% quartz and 15% feldspars) were poured into an autoclave with 21 parts of $Na_2CO_3$ (10% excess) and 160 parts of water. The content of the autoclave was then heated, while stirring, to reach a temperature of 235° C. and maintained in such conditions for about 15 minutes. Then the temperature was lowered and the charge flushed out. The mixture coming out of the autoclave was leached for one hour at around 25° C. with 2700 parts of a cooled aqueous solution, previously saturated at around 90° C. with lithium carbonate. This mixture was filtered and the lithium carbonate from the filtrate was insolubilized by mere heating of the pregnant solution at about 90° C., and, then recovered by filtration. The lithium carbonate thus obtained, and this, without any washing or purification treatment was over 99% pure and represented an overall recovery of 91.5%. The final tailing product was essentially an isometric sodic zeolite, i.e., an hydrated sodium aluminosilicate.

EXAMPLE 2

One hundred parts of calcined low grade spodumene concentrate containing only 3.05% $Li_2O$ (corresponding to a mixture of about 40% spodumene, 35% feldspars, and 25% quartz) were charged in an autoclave with 14 parts of $Na_2CO_3$ (30% excess) and 160 parts of water. The temperature was raised to around 200° C., and held there for one hour. After lowering the temperature below 100°C., the mixture was withdrawn and filtered. The solid residue was mixed with 500 parts of water, stirred for 45 minutes and filtered. Although no washing of the filter cake was effected, the extraction yield, based on the $Li_2O$ content of the filtered residue, was 89% and the $Li_2CO_3$ was 99% pure. The spodumene had been completely converted to an isometric sodic zeolite.

EXAMPLE 3

One hundred parts of calcined spodumene concentrate containing 4.5% $Li_2O$ and corresponding to a mixture of about 60% spodumene, 25% feldspars and 15% quartz, were heated in an autoclave with 31.7 parts of sodium bicarbonate ($NaHCO_3$—25% excess) and 200 parts of water, at 200° C., for a period of one hour. The product therefrom was leached with water at room temperature. After leaching and filtration, the obtained insoluble residue contained 0.56% lithium oxide which corresponds to a recovery of 88%. This residue was not a zeolite but an anhydrous aluminosilicate of sodium, jadeite-like in chemical composition.

EXAMPLE 4

One hundred parts of same concentrate as in Example 3 were heated for one hour at 250° C. with 22 parts of sodium sesquicarbonate and 160 parts of water. The lithium extraction thus obtained was 91.6%.

EXAMPLE 5

*Lithium fluoride directly produced from raw leach solution.*—A solution of lithium carbonate (1500 parts) was obtained by leaching the reaction product of beta spodumene with aqueous sodium carbonate at 200° C. The lithium oxide content of this raw solution was 0.46 percent. To every 100 parts of the solution was added 1.3 parts of sodium fluoride; the solution being constantly stirred during addition. The sodium fluoride dissolved almost immediately. This was followed by the precipitation of lithium fluoride, which was completed within a few minutes. After filtration of the precipitated lithium fluoride, the solution contains only 0.09 percent lithium oxide, showing that 80% of the lithium was precipitated. The analysis showed that the purity of this lithium fluoride was over 98.3%, and this, without resorting to any washing of the precipitate. It was calculated that the amount of lithium left in the solution was corresponding to the solubility of lithium fluoride. Since in industrial practice, this solution would be kept for leaching further primary reaction products, it should be emphasized that for the next precipitation, the solution being saturated, the recovery could be about 100 percent.

The applicants claim:

1. A process for extracting lithium from calcined lithium-bearing silicate, which comprises: reacting said silicate, at a temperature in the range from about 165° C. to about 300° C. under pressure, with a salt selected from the group consisting of sodium bicarbonate and sodium sesquicarbonate in an amount from about 4.3 to about 12 times the weight of the lithium oxide present, water being present in an amount from about 1.4 to about 2.2 times the weight of the lithium-bearing charge, for from about 15 minutes to about 2 hours, to form a mixture containing a solid lithium carbonate and a by-product selected from the group consisting of isometric sodic zeolite and anhydrous sodium aluminosilicate having the chemical composition of jadeite; and separating said carbonate from said by-product.

2. A process, as defined in claim 1, wherein the cooled mixture containing the solid lithium carbonate and the by-product is leached at a temperature between about 0° C. and about 40° C. with cold water in an amount at least 165 to about 250 times the weight of the lithium oxide present in the lithium-bearing silicate, thereby to dissolve the lithium carbonate and to separate a lithium and sodium carbonate solution from a practically lithium-free solid by-product.

3. A process, as defined in claim 2, which comprises, adding water to the product of the decomposing step, in an amount at least 165 to about 250 times the weight of the lithium oxide present in the lithium-bearing silicate to dissolve the lithium carbonate, at a temperature between about 0° C. and about 40° C., separating a relatively pure lithium and sodium carbonate solution from the solid residue, bringing said solution into contact with a salt selected from the group consisting of sodium fluoride, sodium phosphates, sodium silicates and sodium fatty acid salts in an amount in excess from about 1 to about 5 percent over the theoretical amount required for the lithium oxide present, at a temperature from about 50° C. to about 80° C., thereby to form a precipitate of the corresponding lithium salt and recovering said insoluble lithium salt by filtration or centrifugation while regenerating the sodium carbonate in solution form, and returning said sodium carbonate solution to the process.

4. A process for producing lithium carbonate and sodium aluminosilicate, directly from calcined lithium-bearing silicate, which comprises the steps of:

(a) Decomposing said silicate at a temperature from 165° C. to about 300° C. under pressure, with a salt selected from the group consisting of sodium bicarbonate and sodium sesquicarbonate, said salt being in an amount from about 4.3 to about 12 times the weight of the lithium oxide present in the lithium-bearing silicate, water being present in an amount from about 1.4 to about 2.2 times the weight of the lithium-bearing charge for from about 15 minutes to about 2 hours to form a slurry containing solid lithium carbonate and a by-product selected from the group consisting of isometric sodic zeolite and anhydrous sodium aluminosilicate having the chemical composition, (b) Leaching at a temperature from about 0° C. to about 40° C., the cooled slurry obtained in the decomposing step with water in an amount from about 165 to about 250 times the weight of the lithium oxide present, thereby to dissolve the lithium salt and to separate a lithium-bearing solution from a solid by-product, (c) Insolubilizing $Li_2CO_3$ from the solution obtained in the leaching step by raising its temperature to between about 60° C. and about 100° C., and separating crystalline lithium carbonate from the mother liquor returning the mother liquor to the process, (d) Recovering separately lithium carbonate and a by-product selected from the group consisting of isometric sodic zeolite and anhydrous sodium aluminosilicate having the chemical composition of jadeite.

5. A process for extracting lithium from calcined lithium from calcined lithium-bearing silicate, which comprises: reacting said silicate at a temperature from about 190° C. to about 235° C., under pressure with sodium carbonate in an amount from about 3.8 to about 4.6 times the weight of the lithium oxide present, water being present in an amount from about 1.6 to about 2 times the weight of the lithium-bearing charge for a time from about 10 to about 55 minutes, thereby to form a mixture containing lithium carbonate and isometric sodic zeolite, and separating said carbonate from said zeolite.

6. A process, as defined in claim 5, wherein the mixture containing lithium carbonate and isometric sodic zeolite is cooled and leached at a temperature from about 0° C. to about 40° C. with cold water in an amount at least 165 to about 250 times the weight of the lithium oxide present in the calcined lithium-bearing silicate, thereby to dissolve the lithium carbonate and to separate a lithium-bearing solution from a practically lithium-free isometric sodic zeolite.

7. A process for producing lithium carbonate and isometric sodic zeolite directly from calcined lithium-bearing silicate, which comprises the steps of:

(a) Decomposing said silicate at a temperature in the range from about 190° C. to about 235° C. under pressure, with sodium carbonate in an amount from about 3.8 to about 4.6 times the weight of the lithium oxide present in the lithium-bearing silicate, water being present in an amount from about 1.6 to about 2 times the weight of the lithium-bearing charge for from about 10 minutes to about 55 minutes to form a mixture containing solid lithium carbonate and isometric sodic zeolite, (b) Leaching at a temperature from about 0° C. to about 40° C., the cooled mixture obtained in the decomposing step, with water in an amount from about 165 to about 250 times the weight of the lithium oxide present, and separating the solid residue containing the isometric sodic zeolite from the lithium carbonate-bearing solution, (c) Insolubilizing the lithium carbonate from the solution obtained in the leaching step by raising its temperature to between about 60° C. and about 100° C., and separating crystalline lithium carbonate from the mother liquor, and returning the mother liquor to the process, (d) Recovering separately a lithium carbonate and an isometric sodic zeolite.

8. A process, as defined in claim 1, wherein the calcined lithium-bearing silicate is beta spodumene.

9. A process, as defined in claim 1, wherein the lithium-bearing silicate is a mineral selected from the group consisting of petalite, eucryptite and lepidolite, previously calcined to above about 680° C., 980° C. and 850° C., respectively.

10. A process for extracting lithium from calcined lithium-bearing silicate, which comprises: reacting said silicate, at a temperature in the range from about 180° C. to about 215° C., under pressure, with sodium bicarbonate in an amount from about 6 to about 12 times the weight of the lithium oxide present in the calcined lithium-bearing silicate, the water being present in an amount from about 1.5 to about 2 times the weight of the lithium-bearing charge, for from about one hour to about two hours, to form a mixture containing solid lithium carbonate and an anhydrous sodium aluminosilicate having the chemical composition of jadeite, cooling said mixture, and separating the carbonate and silicate therefrom.

11. A process for extracting lithium from calcined lithium-bearing silicate, which comprises: reacting said silicate, at a temperature in the range from about 225° C. to about 300° C., under pressure, with sodium bicarbonate in an amount from about 6 to about 12 times the weight of the lithium oxide present in the calcined lithium-bearing silicate, water being present in an amount from about 1.5 to about 2.2 times the weight of the lithium-bearing charge, for from about 15 minutes to about 90 minutes, to form a mixture containing solid lithium carbonate and an isometric sodic zeolite, cooling said mixture, and separating the carbonate and the sodic zeolite.

12. A process for extracting lithium from calcined lithium-bearing silicate, which comprises: reacting said silicate, at a temperature in the range from about 165° C. to about 205° C., under pressure, with sodium sesquicarbonate in an amount from about 4.3 to about 8.6 times the weight of the lithium oxide present in the calcined lithium-bearing silicate, water being present in an amount from about 1.4 to about 1.8 times the weight of the lithium-bearing charge, for from about 30 minutes to about 1 hour, to form a mixture containing solid lithium carbonate and an anhydrous sodium aluminosilicate having the chemical composition of jadeite, cooling said mixture and separating the lithium carbonate and the aluminosilicate therefrom.

13. A process for extracting lithium from calcined lithium-bearing silicate, which comprises: reacting said silicate, at a temperature in the range from about 185° C. to about 275° C., under pressure, with sodium sesquicarbonate in an amount from about 4.3 to about 8.6 times the weight of the lithium oxide present in the calcined lithium-bearing silicate, water being present in an amount from about 1.4 to about 2 times the weight of the lithium-bearing charge, for from about 20 minutes to about 75 minutes, to form a mixture containing solid lithium carbonate and sodic zeolite, cooling said mixture, and separating the carbonate and the sodic zeolite.

14. A process, as defined in claim 1, wherein the cooled mixture containing the solid lithium carbonate and the by-product is leached at a temperature between about 0° C. and about 40° C. with cold water in an amount at least 165 to about 250 times the weight of the lithium oxide present in the calcined lithium-bearing silicate, therey to dissolve the lithium carbonate and to separate a lithium and sodium carbonate solution from a practically lithium-free solid by-product, and heating said carbonate solution to a temperature between about 60° C. to about 100° C. to insolubilize the lithium carbonate as a crystalline product.

15. A process, as defined in claim 5, wherein the mixture containing lithium carbonate and isometric sodic zeolite is cooled and leached at a temperature from about 0° C. to about 40° C. with cold water in an amount at least 165 to about 250 times the weight of the lithium oxide present in the calcined lithium-bearing silicate, thereby to dissolve the lithium carbonate and to separate a lithium-bearing solution from a practically lithium-free isometric sodic zeolite, and heating said lithium-bearing solution at a temperature from about 60° C. to about 100° C. thereby to insolubilize the lithium carbonate as a crystalline product.

16. A process for forming lithium fluoride, comprising, reacting a calcined lithium-bearing silicate under hydrothermic conditions with an aqueous sodium carbonate to produce an aqueous mixture containing hot water-insoluble lithium carbonate and sodium aluminosilicate, separating the carbonate from the aluminosilicate, adding cold water and carbon dioxide thereby to solubilize the lithium carbonate as bicarbonate and to form a residue, separating the residue from the bicarbonate solution, and treating the bicarbonate solution with a fluorine compound to produce lithium fluoride.

17. A process for extracting lithium values from calcined lithium-bearing silicate, comprising, reacting said silicate hydrothermically with a reactant consisting essentially of a sodium salt selected from the group consisting of sodium bicarbonate and sodium sesquicarbonate, said sodium salt being in an amount ranging from about 4.3 to about 12 times the weight of the lithium oxide present in the calcined lithium-bearing silicate and water in an amount ranging from about 1.4 to about 2.2 times the weight of the lithium-silicate, producing thereby an aqueous mixture containing hot water-insoluble lithium carbonate and sodium aluminosilicate, cooling the mixture, and recovering the lithium carbonate free of the aluminosilicate.

18. A process, as defined in claim 17, in which the reactant is sodium bicarbonate, the amount of sodium bicarbonate being within the range from about 4.3 to about 8.6 times the weight of the lithium oxide present in the calcined lithium-bearing silicate, water being present in an amount from about 1.4 to about 1.8 times the weight of the calcined lithium-bearing silicate.

19. A process, as defined in claim 17, in which the reactant is sodium sesquicarbonate which is present in an amount ranging from about 6 to about 12 times the weight of the lithium oxide present in the calcined lithium-bearing silicate, the amount of water present being from about one and one half times to about twice the weight of the calcined lithium-bearing silicate.

20. A process, as defined in claim 17, in which the temperature of the reaction is within the range from about 180° C. to about 275° C.

21. A process for extracting lithium values from calcined lithium-bearing silicate, comprising, reacting said silicate hydrothermically with a reactant consisting essentially of a sodium salt selected from the group consisting of sodium bicarbonate and sodium sesquicarbonate, said sodium salt being in an amount ranging from about 4.3 to about 12 times the weight of the lithium oxide present in the calcined lithium-bearing silicate and water in an amount ranging from about 1.4 to about 2.2 times the weight of the lithium-silicate, producing thereby an aqueous mixture containing hot water-insoluble lithium carbonate and sodium aluminosilicate, cooling the mixture, adding enough cold water to solubilize the lithium and separating the resulting lithium solution from the solid residue.

22. A process for producing lithium salts selected from the group comprising lithium fluoride, phosphate, silicates and fatty acids salts, which comprises reacting a calcined lithium-bearing silicate under hydrothermic conditions with a sodium carbonate and water producing thereby an aqueous mixture containing hot water-insoluble lithium carbonate and sodium aluminosilicate, adding cold water to said aqueous mixture solubilizing thereby the lithium carbonate thereby providing a solution containing dissolved lithium carbonate and solid sodium aluminosilicate, separating the lithium carbonate solution from the aluminosilicate, treating the carbonate solution with a sodium salt selected from the group consisting of the fluoride, the phosphate, the silicate and the fatty acids salts, producing thereby the corresponding water-insoluble lithium salt and recovering the latter.

23. A method of preparing a calcined lithium-bearing silicate to a state in which the lithium values may be recovered, comprising, reacting said silicate hydrothermically with a reactant consisting essentially of a sodium salt selected from the group consisting of sodium bicarbonate and sodium sesquicarbonate, said sodium salt being in an amount ranging from about 4.3 to about 12 times the weight of the lithium oxide present in the calcined lithium-bearing silicate and water in an amount ranging from about 1.4 to about 2.2 times the weight of the lithium-silicate, producing thereby an aqueous mixture containing hot water-insoluble lithium carbonate and sodium aluminosilicate.

References Cited in the file of this patent

UNITED STATES PATENTS

| | | |
|---|---|---|
| 1,515,001 | Grisewald et al. | Nov. 11, 1924 |
| 1,675,786 | Buchner | July 3, 1928 |
| 2,413,644 | Nicholson | Dec. 31, 1946 |
| 2,924,507 | Peterson | Feb. 9, 1960 |

FOREIGN PATENTS

| | | |
|---|---|---|
| 596,302 | Canada | Apr. 19, 1960 |

OTHER REFERENCES

Mellor: A Comprehensive Treatise on Inorganic and Theoretical Chemistry, vol. 2, page 512, Longmans, Green and Company (1955).

UNITED STATES PATENT OFFICE
CERTIFICATE OF CORRECTION

Patent No. 3,112,172 November 26, 1963

Maurice Archambault et al.

It is hereby certified that error appears in the above numbered patent requiring correction and that the said Letters Patent should read as corrected below.

In the grant, lines 3 to 5, for "assignors to Department of Natural Resources of the Province of Quebec, of Quebec, Quebec, Canada" read -- assignors to Ministere des Richesses Naturelles, Province de Quebec, of Quebec, Quebec, Canada --; lines 14 and 15, for "Department of Natural Resources of the Province of Quebec, its successors" read -- Ministere des Richesses Naturelles, Province de Quebec, its successors --; in the heading to the printed specification, lines 5 to 7, for "assignors to Department of Natural Resources of the Province of Quebec, Quebec, Quebec, Canada" read -- assignors to Ministere des Richesses Naturelles, Province de Quebec, Quebec, Quebec, Canada --.

Signed and sealed this 4th day of August 1964.

(SEAL)
Attest:

ERNEST W. SWIDER
Attesting Officer

EDWARD J. BRENNER
Commissioner of Patents